United States Patent [19]

Garrels

[11] Patent Number: 4,480,662

[45] Date of Patent: Nov. 6, 1984

[54] HYDRAULIC SYSTEM VALVE

[76] Inventor: Wilbur D. Garrels, 4421 Ward St., Wichita Falls, Tex. 76310

[21] Appl. No.: 382,607

[22] Filed: May 27, 1982

Related U.S. Application Data

[63] Continuation-in-part of Ser. No. 368,003, Apr. 13, 1982, abandoned.

[51] Int. Cl.³ ............................................ F16K 11/085
[52] U.S. Cl. ............................ 137/625.23; 137/625.3; 137/625.47; 251/121
[58] Field of Search ...................... 137/625.22, 625.23, 137/625.47, 625.3; 251/59, 121, 207

[56] References Cited

U.S. PATENT DOCUMENTS

| | | | |
|---|---|---|---|
| 1,810,331 | 6/1931 | Wilhjelm . | |
| 2,229,931 | 1/1941 | Parker | 137/625.22 |
| 2,853,099 | 9/1958 | Eitel | 251/59 |
| 3,023,783 | 3/1962 | Vickery | 137/625.12 |
| 3,134,405 | 5/1964 | White et al. . | |
| 3,821,968 | 7/1974 | Barb | 137/625.3 |
| 4,219,049 | 8/1980 | Skelly | 137/625.3 |

Primary Examiner—Alan Cohan
Assistant Examiner—Mark Malkin
Attorney, Agent, or Firm—Sixbey, Friedman & Leedom

[57] ABSTRACT

A fluid pressure equalizing valve adapted for use in hydraulic systems includes a valve body having fluid inlet, working and vent ports, a valve plug in the valve body having a working passageway and a vent passageway formed therein and communicating with the peripheral wall thereof, the plug being rotatable in the valve body between a working position wherein the working passageway is aligned with the inlet and working ports and a vent position wherein the vent passageway is aligned with the inlet and vent ports. The valve plug includes a plurality of orifice passageways formed therein communicating the peripheral wall thereof with the vent passageway, each orifice passageway having a substantially smaller diameter than the working passageway. Means are provided for preventing fluid flow through the orifice passageways when the valve plug is in the working and vent positions. At least one orifice passageway communicates at least one of the inlet and working ports with the vent ports via the vent passageway as the valve plug moves between working and vent positions. The orifice passageways may be of varying sizes and shapes and may be selectively closed by removably insertable plug means. Rotation of the valve plug within the valve body is desirably achieved using hydraulic means, but other means may be used.

13 Claims, 3 Drawing Figures

HYDRAULIC SYSTEM VALVE

DESCRIPTION

Cross-Reference to Related Applications

This application is a continuation-in-part of copending application Ser. No. 368,003, filed Apr. 13, 1982, now abandoned.

TECHNICAL FIELD

The present invention relates to valves and, more particularly, to valves for use in hydraulic systems.

BACKGROUND ART

In the operation of hydraulic pumping units useful in oil well applications, the bridle and attached well polish rod move upwardly and downwardly in direct response to the flow of hydraulic fluid into and out of hydraulic cylinders having piston rods therein which are attached to the bridle and well polish rod. Thus, a pumping unit forces hydraulic fluid from a tank through an open hydraulic control valve into the bottom of a hydraulic cylinder to raise the piston rod therein which causes the attached bridle and well polish rod to be pulled upwardly. Fluid continues to be pumped into the hydraulic cylinder until an upper limit switch closes the hydraulic control valve and vents the cylinder to the tank. Under these conditions, the weight of the bridle and polish rod pulls the piston down causing fluid to flow out of the hydraulic cylinder and into the tank.

In most hydraulic pumping systems, pilot operated relief valves are used to control piston rod movement. However, pilot operated valves offer two significant disadvantages. Due to close tolerances within the valves, they are subject to malfunction due to the accumulation of foreign material within the valve or due to expansion or contraction resulting from thermal transients to which the valve is exposed. In addition, the design of these valves is such that the transition from pressure to vent or vent to pressure positions is rapid, thus producing a sudden hydraulic shock due to the pressure transient. This shock is extremely undesirable in the operation of the hydraulic pumping system.

U.S. Pat. No. 4,219,049–Skelly discloses a valve for use in a hydraulic system to feather the hydraulic shock associated with increasing hydraulic fluid flow by suddenly bringing on-line additional hydraulic fluid pumps. The Skelly valve comprises two separate valve body elements which are relatively rotatable on a common shaft. A first valve body element provides a pair of separated cavities, one of which is connected to a working outlet port and the other to a vent outlet port. The other valve body element has a plurality of inlet ports connectable to a plurality of separate hydraulic pump outlets. By relative rotation of the valve body elements one or more of the inlet ports can be placed into communication with the cavity connected to the working outlet port to vary the working hydraulic fluid flow.

U.S. Pat. No. 3,134,405–White et al discloses a valve for use in high pressure gas systems to provide a controlled rate of change of pressure differential and avoid shock as the high pressure upstream side of the valve is brought into communication with the lower pressure downstream side of the valve. This is accomplished by providing, in a ball valve, a relatively small diameter bleed passageway extending diametrically through the ball at a substantial angle to the relatively large diameter normal flow bore in the ball such that the small diameter bleed passageway communicates with the valve inlet and outlet ports to gradually equalize upstream and downstream pressure before the relatively large diameter bore allows full flow through the valve between the ports.

However, none of the prior art valves allows sufficiently selective control of the pressure equalizing flow area to permit smooth pressure transitions in all circumstances. It is therefore the purpose of the present invention to overcome previously encountered practical difficulties and to provide an efficient, simple and relatively inexpensive valve for use in hydraulic systems which permits a smooth transition of hydraulic fluid as the valve switches between pressure and vent positions.

DISCLOSURE OF THE INVENTION

In one aspect of the present invention this is accomplished by providing a fluid pressure equalizing valve adapted for use in fluid systems which includes a valve body having a fluid inlet port, a discharge working port and at least one discharge vent port, a valve plug in the valve body having a working passageway and a vent passageway formed therein and communicating with the peripheral wall thereof, the plug being movable with respect to the valve body between a working position wherein the working passageway is aligned with the inlet and working ports and a vent position wherein the vent passageway is aligned with the inlet and/or working port and at least one vent port. The valve plug also includes a plurality of orifice passageways formed therein communicating the peripheral wall of the plug with the vent passageway, the diameter of each orifice passageway being substantially smaller than the diameter of the working passageway, and means preventing fluid flow through the orifice passageways when the plug is in the working and vent positions. At least one of the orifice passageways communicates at least one of the inlet and working ports with the vent port via the vent passageway as the plug moves between its working and vent positions. Means are provided for selectively closing any of the orifice passageways.

In another aspect of the invention the orifice passageways are arranged such that movement of the valve plug between working and vent positions, and vice versa, selectively adds or substracts the number of orifice passageways carrying fluid flow between the inlet and/or working ports and the vent passageway. This, together with the means for selectively closing any of the orifice passageways, provides a high degree of selectivity and control over the vent flow and working flow areas to allow smooth pressure transients.

In a particularly preferred embodiment of the invention, removably insertable plug means are provided for selectively closing the orifice passageways; hydraulic means are provided for moving the valve plug between its first and second positions; and the valve body has an annular configuration for receiving a generally cylindrical valve plug therewithin with the working, vent and orifice passageways thereof communicating with the peripheral wall of the cylindrical plug.

BEST MODE FOR CARRYING OUT THE INVENTION

Figure 1:
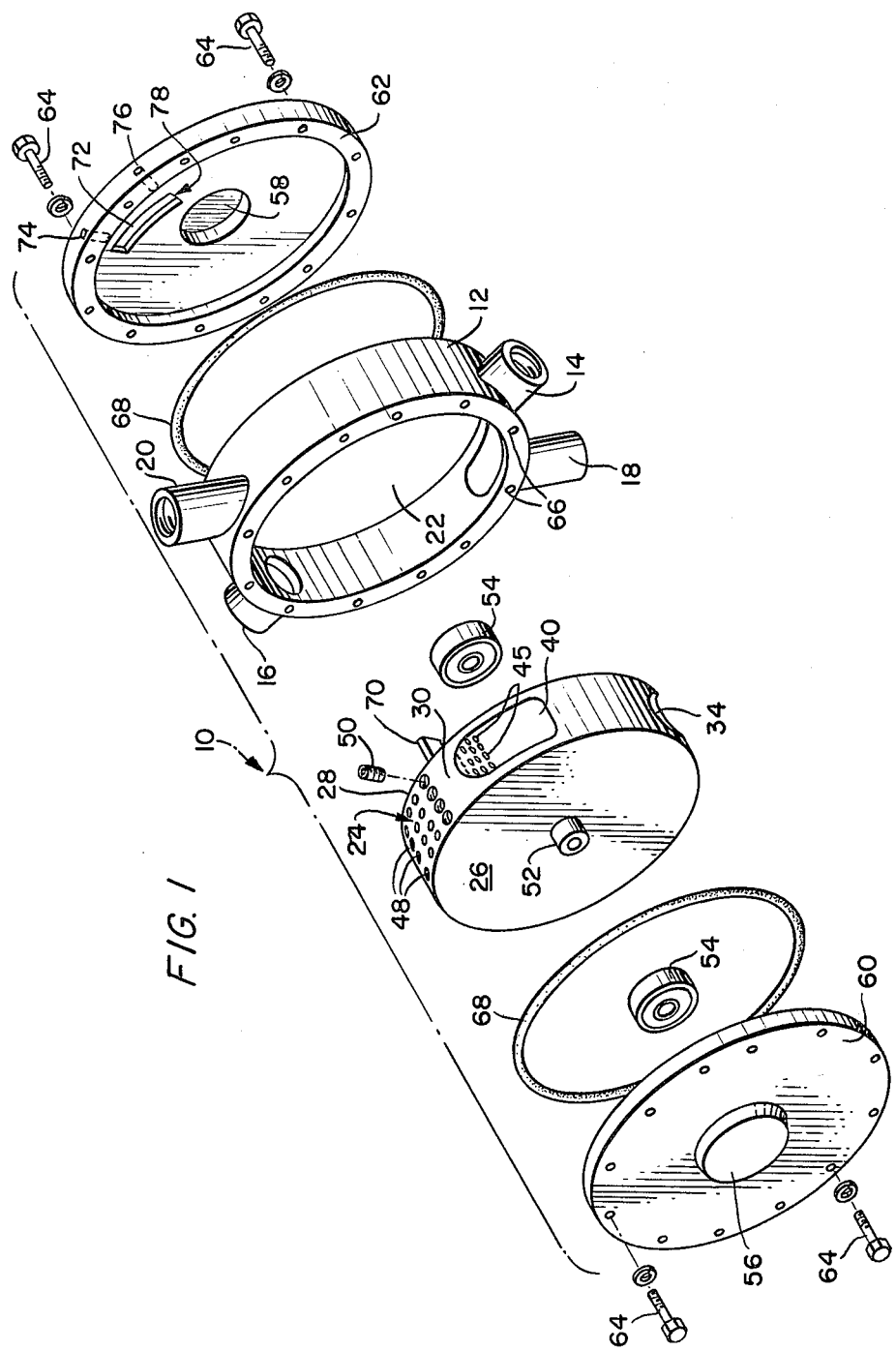
FIG. 1 is an exploded view of the valve of the present invention.

Referring to the drawings, reference numeral 10 represents the fluid pressure equalizing valve of the present invention which is particularly useful to smoothly transition hydrualic fluid flow between working and vent conduits without hydraulic shock. Valve 10 consists of a valve body 12 which is generally annular in shape and is provided with a hydraulic fluid inlet port 14, a hydraulic fluid discharge working port 16, and hydraulic fluid vent ports 18,20. The annular valve body encloses a generally circular opening 22 for receiving a generally cylindrical valve plug 24 therein. Valve plug 24 consists of opposed generally cylindrical faces 26,28 connected by peripheral wall 30 extending therebetween. A working fluid flow passageway 32 is formed in and extends diametrically through plug 24 and communicates with the peripheral wall 30 via working passageway openings 34,36. Circumferentially spaced from the working passageway openings 34,36 are diametrically opposed, arcuate shaped vent cavities 38,40 formed in peripheral wall 30. These cavities, as will be seen from the discussion which follows, define vent passageways for venting hydraulic fluid to a tank (not shown) or other convenient location. A plurality of first and second orifice passageways 42,44 extend between openings 43,45 formed in the wall of vent cavities 38,40 and openings 46,48 formed in peripheral wall 30 between working passageway opening 34 and vent cavity 38 and between working passageway opening 36 and vent cavity 40. The orifice passageways, which are of small diameter relative to the diameter of working passageway 32, may be of the same or of varying diameters, may be of varying cross-sectional shapes, such as circular, oval, triangular, quadrilateral, hexagonal, and the like, and any orifice passageway may be selectively and individually closed by inserting therein an appropriately sized and shaped removable plug 50.

Valve plug 24 is mounted for rotation within valve body 12 in order to move the various passageways into and out of alignment with the various ports, as will be described more fully hereinafter, about axially aligned rotor shaft stubs 52 which project forwardly from face 26 and rearwardly from face 28 of valve plug 24. Rotation of the valve plug about the shaft stubs 52 is facilitated by rotor shaft bearings 54 in which the shaft stubs are received. The shaft bearings 54 are, in turn, received and supported within sockets 56,58 formed in front and rear cover plates 60,62. With valve plug 24 received within valve body 12, and rotor shaft bearings 54 on shaft stubs 52 received within sockets 56,58, cover plates 60,62 fluid-tightly close and are secured to the open ends of valve body 12 in conventional manner, as by the use of screws and threadedly engaging correspondingly threaded apertures 66 in the annular wall of valve body 12. Suitable sealing means, such as O-rings 68, are provided for affording fluid tight seals between the valve body 12 and cover plates 60,62 to prevent leakage.

The valve plug 24 may conveniently rotate within valve body 12 by hand-operated handle means (not shown) but is more conveniently rotated via fluid or electric means. Thus, for example, a vane 70 may extend rearwardly from rear face 28 of valve plug 24 to be received within a recess 72 formed along a circular arc in rear cover plate 62. Actuator ports 74,76 formed in the peripheral wall of cover plate 62 have one end communicating with recess 72 and the other end opening through the peripheral wall for communicating with a source of hydraulic fluid (not shown). With valve 10 in fully assembled configuration, vane 70 extends into recess 72 and rear face 28 of plug 24 fluid tightly abuts the portion of cover plate 62 surrounding recess 72. In this manner, recess 72 and rear face 28 define a hydraulic chamber 78 for receiving and discharging hydraulic fluid for moving vane 70 along an arcuate path defined by recess 72 and, simultaneously, for causing the rotational movement of plug 24 within valve body 12.

INDUSTRIAL APPLICABILITY

The pressure equalizing valve of the present invention is broadly applicable in hydraulic systems, such as pumping systems, for smoothly transitioning the flow of hydraulic fluid between vent and working conduits. The configuration of the valve is illustrated in the drawings and its operation will be better understood from the following description.

Valve plug 24 is rotatable within valve body 12, such as by hydraulic means hereinbefore described, between: (1) a fluid working position (FIG. 2) wherein openings 34,36 of working passageway 32 are aligned with inlet port 14 and discharge working port 16, respectively, to allow working fluid under pressure to pass from a source (not shown) through working port 16; and, (2) a fluid vent position (FIG. 3) wherein vent cavity 38 is aligned with circumferentially spaced apart, but closely adjacent, inlet port 14 and vent port 18, and vent cavity 40 is aligned with circumferentially spaced apart, but closely adjacent, discharge working port 16 and vent port 20.

Figure 2:
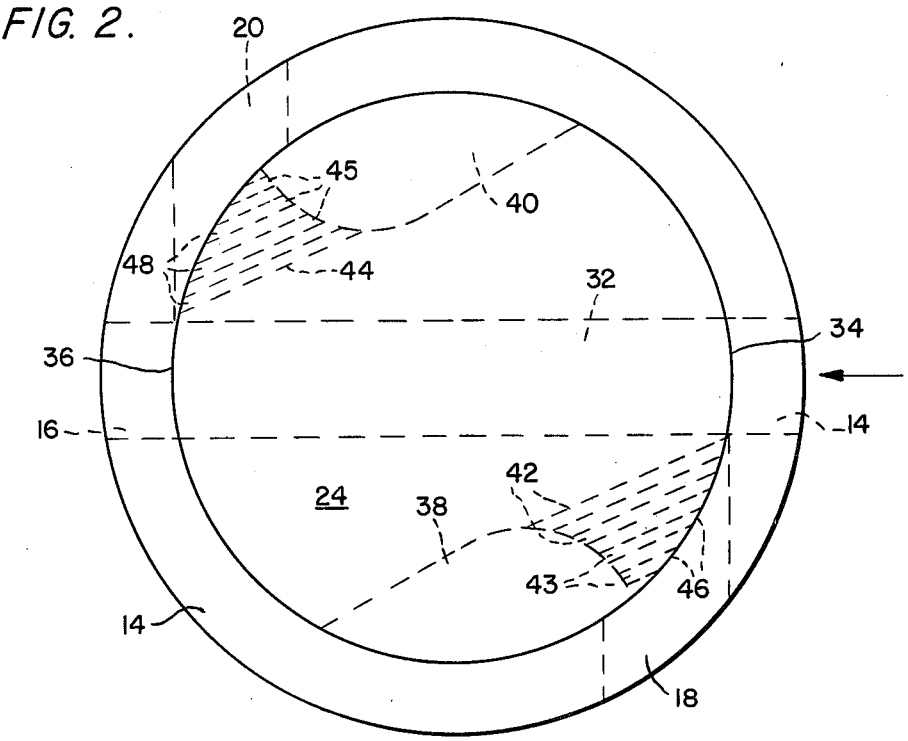
FIG. 2 is a front elevational view of the assembled valve body and valve plug showing the orientation of the working, vent and orifice passageways relative to the ports with the valve plug in its working position.

In the working position shown in FIG. 2 there is no fluid flow communication between either the inlet or discharge working ports 14,16 and the vent cavities 38,40, i.e., the orifice passageways 42,44 are out of communication with both the inlet and discharge working ports 14,16 and there is no fluid flow therethrough. Peripheral wall openings 46,48 of orifice passageways 42,44 communicate with vent ports 18,20, respectively. Accordingly, all inlet fluid entering valve 10 via port 14 and working passageway 32 is discharged through discharge working port 16.

Figure 3:
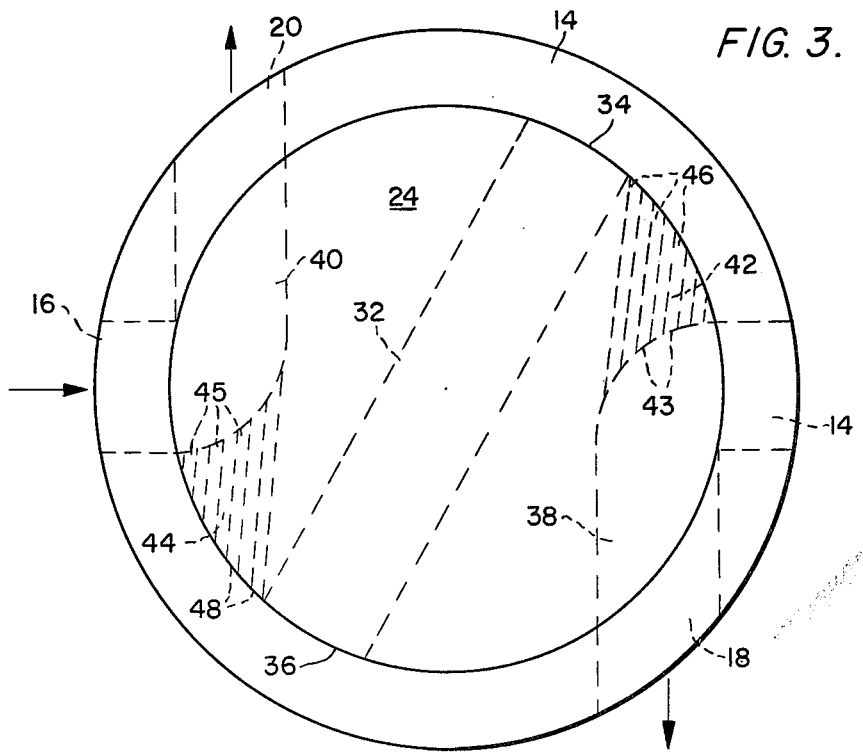
FIG. 3 is a front elevational view of the assembled valve body and valve plug showing the orientation of the working, vent and orifice passageways relative to the ports with the valve plug in its vent position.

In the vent position shown in FIG. 3 there is no fluid flow communication between the inlet and discharge working ports 14,16, i.e., working passageway 32 is out of communication with both the inlet and discharge working ports 14,16. Moreover, there is no fluid flow through orifice passageways 42,44 since peripheral wall openings 46,48 are blocked by annular valve body 12. All inlet flow through either inlet port 14 or discharge working port 16 is directed by vent cavities 38,40 through vent ports 18,20 to tank or other convenient means (not shown).

The functioning of valve 10 as a pressure equalizing valve to avoid hydraulic shock and to smooth fluid flow transitions between working and vent conduits becomes apparent as the change in fluid flow path is traced between valve vent and working positions. As has been indicated, in the vent position shown in FIG. 3 all flow through inlet and working ports 14,16 is vented via vent cavities 38,40 through vent ports 18,20. As valve plug 24 is rotated in a clockwise direction in FIG. 3 from the vent position toward the working position shown in FIG. 2, it can be seen that the first and second orifice passageways 42,44 gradually come into fluid flow communication with the inlet and working ports 14,16 and that a portion of the flow which had been vented directly through vent cavities 38,40 now begins to flow via orifice passageways 42,44 into vent cavities 38,40. It will be appreciated, however, that due to the relatively small diameter of the orifice passageways, the vent flow through the combination of orifice passageways and vent cavities is somewhat smaller than the vent flow discharged directly through the vent cavities alone. Moreover, by closing any selected orifice passageways using removably insertable plugs 50, the amount of flow discharged through the vent ports can be most carefully monitored and controlled. As valve plug 24 continues to rotate in a clockwise direction the number of first and second orifice passageways 42,44 which are moved into fluid flow communication with inlet and working ports 14,16 continues to increase and the proportion of vent flow through orifice passageways 42,44 into vent cavities 38,40 increases as the proportion of vent flow directly into the vent cavities 38,40 correspondingly decreases. This continues until the vent cavities 38,40 are rotated out of fluid flow communication with ports 14,16 at which time all vent flow is via orifice passageways 42,44. As rotation of valve plug 24 continues, the number of first and second orifice passageways 42,44 in fluid flow communication with inlet and working ports 14,16 decreases and working passageway 32 gradually rotates into fluid flow communication with ports 14,16 to commence working fluid flow through passageway 32. In this way the flow through working port 16 gradually increases and the transition from vent to working positions continues slowly and without hydraulic shock until the working position of FIG. 2 is reached.

In like manner, the flow can be transitioned gradually and without shock from the working position of FIG. 2 back to the vent position of FIG. 3 by rotating valve plug 24 in a counter-clockwise direction in FIG. 2. It can be seen that as rotation commences the first and second orifice passageways 42,44 gradually move into fluid flow communication with ports 14,16 and vent flow via orifice passageways 42,44, vent cavities 38,40 and vent ports 18,20 gradually is substituted for working fluid flow through working passageway 32. As counter-clockwise rotation continues the number of orifice passageways 42,44 which are in fluid flow communication with inlet and working ports 14,16 continues to increase until an intermediate position (not shown) is reached wherein working passageway 32 is rotated out of communication with ports 14,16 and all flow through ports 14 and 16 is vent flow which is directed via the first and second orifice passageways 42,44 to vent cavities 38,40 and then through vent ports 18,20. As counter-clockwise rotation of valve plug 24 continues, the first and second orifice passageways 42,44 begin to move out of fluid flow communication with the inlet and working ports 14,16 and the vent cavities 38,40 begin to directly divert some of the inlet flow through the vent ports 18,20 until the vent position of FIG. 3 is reached wherein all inlet flow is diverted directly through vent cavities 38,40 to vent ports 18,20.

It will be appreciated that the ability to selectively and gradually increase or decrease the flow area for working or vent flow by rotation of valve plug 24 to substitute smaller diameter orifice passageways for the larger diameter working passageway 32 or vent cavities 38,40 as the conduits for working or vent flow permits close control over the working to vent transition flow, and vice-versa, and allows the transition to occur smoothly. Even more careful and precise control over the transition from working to vent flow, and vice-versa, is achieved by use of the removably insertable plugs 50 to selectively close any combination of first and second orifice passageways. When it is appreciated that the orifice passageways may vary in size and shape and thus in flow carrying capability, it can be seen that selective use of plugs 50 can effectively afford very close control over the flow transition. By these means it is possible to custom tailor the flow area of the orifice openings for each hydraulic system in which the valve of the present invention may be installed and, further, to accomodate changing conditions within each system. In this way the valve of the present invention may be used in systems having substantially different operating conditions and be adjusted to accommodate any particular operating conditions while still operating efficiently and effectively. Moreover, in addition to controlling flow transition by varying the cross sectional size and shape of the orifice passageways, the speed of valve operation can be varied to control flow transition.

I claim:

1. A fluid pressure equalizing valve adapted for use in hydraulic systems comprising:

a valve body having a fluid inlet port, a fluid discharge working port and at least one fluid discharge vent port therein;

a valve plug comprising a plug body having a peripheral wall, said plug disposed in said valve body and having a working flow passageway and at least one vent flow passageway formed therein and communicating with said peripheral wall, said plug being movable with respect to said valve body between a first fluid working position wherein said working flow passageway is aligned with said fluid inlet and said fluid discharge working ports to provide fluid flow communication therebetween for passing inlet fluid to the working port and a second fluid vent position wherein said vent flow passageway is aligned with at least one inlet and fluid discharge working ports and said fluid discharge vent port to provide fluid flow communication therebetween for passing inlet fluid to a vent port;

said valve plug including a plurality of orifice passageways formed therein communicating said peripheral wall with said vent flow passageway, the diameter of each said orifice passageway being substantially smaller than the diameter of said working flow passageway, means preventing fluid flow through said orifice passageways when said valve plug is in its first and second positions, at least one of said orifice passageways communicating at least one of said inlet and discharge working ports and said vent port via said vent flow passageway as said valve plug moves between its first and second positions, said orifice passageways being arranged such that said valve plug is movable from its first position to its second position, and vice versa, to selectively subtract or add, respectively, the number of orifice passageways communicating said inlet and working ports with said vent port via said vent flow passageway;

plug means for selectively closing any of said orifice passageways, said plug means being removably insertable in said orifice passageways; and means for moving said valve plug between is first and second positions.

2. A valve, as claimed in claim 1, wherein the flow areas of at least some of said orifice passageways differ from the flow areas of others of said orifice passageways.

3. A valve, as claimed in claims 1 or 2, wherein said means for moving said valve plug comprises hydraulic means.

4. A valve, as claimed in claim 3, wherein said hydraulic means includes vane means on said valve plug, an elongated vane receiving chamber associated with said valve body, said vane means projecting into and slidable within said chamber, and spaced apart hydraulic fluid ports communicating with said chamber adjacent its ends for providing hydraulic fluid flow into and out of said chamber, whereby said vane slides in said chamber between the ends thereof in response to the force exerted thereon by the hydraulic fluid for moving the valve plug between its first and second positions.

5. A valve, as claimed in claim 1 or 2, wherein said valve body is annular and includes a generally cylindrical peripheral wall surface defining a generally cylindrical opening therewithin, said valve plug is generally cylindrical and rotatable within said valve body about a central axis coaxial with the axis of said valve body between its first and second positions.

6. A valve, as claimed in claim 5, wherein said working passageway extends diametrically through said plug for alignment with diametrically opposed fluid inlet and working ports when said plug is in its first position.

7. A valve, as claimed in claim 5, wherein said vent flow passageway comprises first and second arcuate shaped cavities formed in and circumferentially spaced apart along the peripheral wall of said valve plug.

8. A valve, as claimed in claim 7, wherein said plurality of orifice passageways comprise a first plurality of orifice passageways communicating said first arcuate shaped cavity with the peripheral wall of said plug and a second plurality of orifice passageways communicating said second arcuate shaped cavity with the peripheral wall of said plug.

9. A valve, as claimed in claim 8, wherein said fluid inlet port and a fluid discharge vent port are circumferentially spaced along said annular valve body and sufficiently close that a single arcuate shaped cavity comprising one vent passageway provides fluid flow communication therebetween when said valve plug is in its second position.

10. A valve, as claimed in claim 8, wherein said fluid discharge working port and a fluid discharge vent port are circumferentially spaced apart along said annular valve body and sufficiently close that a single arcuate shaped cavity comprising one vent passageway provides fluid flow communication therebetween when said valve plug is in its second position.

11. A valve, as claimed in claim 5, wherein said valve body includes a pair of cover plates fluid tightly engaging the forwardly and rearwardly facing annular surfaces of said annular valve body.

12. A valve, as claimed in claim 11, including axially aligned shaft stubs projecting forwardly and rearwardly from the opposite faces of said generally cylindrical valve plug along the central axis thereof, said stubs being supported in said cover plates for rotation of said valve plug thereabout.

13. A valve, as claimed in claim 11, including an elongated arc-shaped vane receiving recess formed in one of said cover plates, spaced apart hydraulic fluid inlet and outlet ports formed in said one cover plate communicating with said recess adjacent its ends for providing a hydraulic fluid flow path to and from said recess, a vane projecting from one face of said generally cylindrical valve plug toward said recess-containing cover plate and received within said recess with said one face of said valve plug in fluid tight abutting relation with the portion of said cover plate surrounding said recess to define with said recess a fluid-tight hydraulic chamber for arcuate sliding movement of said vane within said chamber in response to hydraulic fluid force exerted thereon whereby said valve plug rotatably moves between its first and second positions.

* * * * *